H. R. AULD.
VULCANIZING APPARATUS.
APPLICATION FILED AUG. 25, 1919. RENEWED OCT. 7, 1920.

1,360,982.

Patented Nov. 30, 1920.

Inventor,
Hugh R. Auld;
By A. B. Upham,
Attorney.

UNITED STATES PATENT OFFICE.

HUGH ROBERT AULD, OF BOSTON, MASSACHUSETTS, ASSIGNOR TO THOMAS L. HARKINS, OF BOSTON, MASSACHUSETTS.

VULCANIZING APPARATUS.

1,360,982.  Specification of Letters Patent.  Patented Nov. 30, 1920.

Application filed August 25, 1919, Serial No. 319,828. Renewed October 7, 1920. Serial No. 415,395.

*To all whom it may concern:*

Be it known that I, HUGH R. AULD, a subject of the Dominion of Canada, and a resident of Boston, in the county of Suffolk and Commonwealth of Massachusetts, have invented certain new and useful Improvements in Vulcanizing Apparatus, of which the following is a specification.

Figure 1:
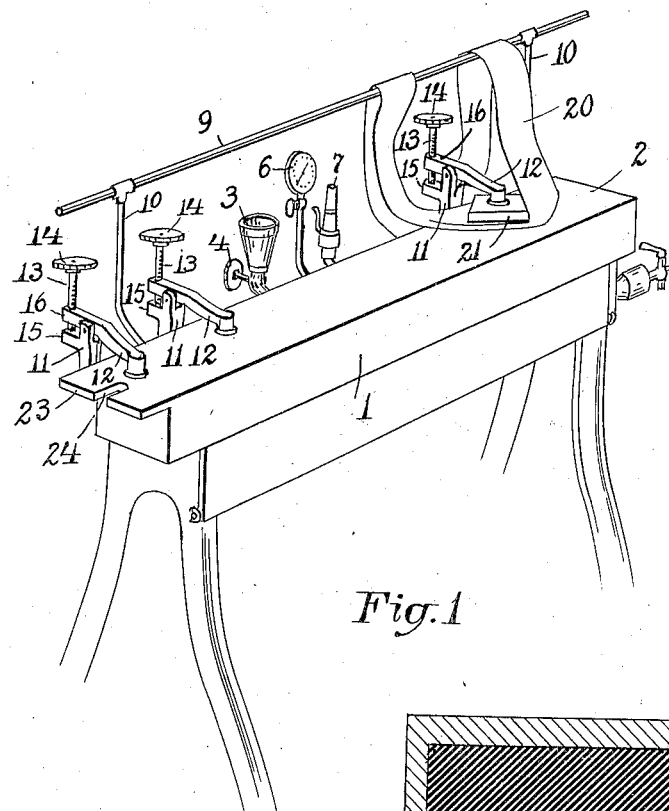
Figure 3:
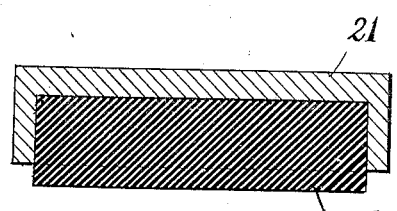
Figure 2:
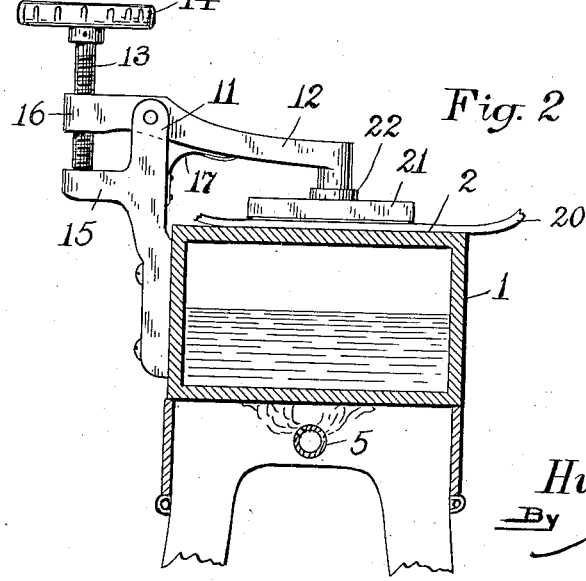

The object of this invention is the effecting of certain improvements in vulcanizing apparatus for the inner tubes of pneumatic tires, as hereinafter set forth, and illustrated in the accompanying drawings, in which Figure 1 is a perspective view of apparatus embodying my improvements. Fig. 2 is a cross section thereof on a larger scale. Fig. 3 is a sectional view of the pressure block.

The reference character 1 designates an elongated receptacle having a flat top 2, designed to be partially filled with water, as through a funnel 3 closed by a cock 4, which water is to be heated by means of a gas burner 5 shown in Fig. 2, or by other suitable means. A pressure gage 6 shows when the steam pressure within the receptacle reaches a predetermined height, and of a temperature suitable for the vulcanizing purposes desired. A safety valve and whistle 7 serves to give warning of undue pressure and to relieve the same when the attendants are elsewhere.

Behind and above the vulcanizing surface 2 and suitably spaced therefrom, is a rail 9 over which the tires can be thrown when parts thereof are being repaired, the posts 10 supporting the rail and being themselves attached at their lower ends to the receptacle 1.

To the back of the receptacle are attached several standards 11 each having pivoted to its upper end a lever arm 12, and tapped through the rear end of each lever arm is a set screw 13 having an operative hand wheel 14, the end of which set screw abuts against an arm 15 projecting from the standard 11. By suitably turning this set screw, the rear part 16 of the lever arm is forced upward and its operative portion 12 is forced down toward the vulcanizing surface 2. A leaf spring 17 raises each lever arm when the set screw is turned backward.

The operation of the machine is as follows: Sufficient heat having been applied to the water in the receptacle to give sufficient steam pressure therein to provide the required vulcanizing heat to the surface 2, the rubber article, as an inner tube 20, to which a patch has been applied suitably coated with rubber cement, is laid upon the surface 2, and a hot block 21 placed over the patch beneath the nose 22 of a lever arm 12. Then the set screw 13 is revolved until the block 21 is pressed upon the patch with the required firmness, and the parts allowed to remain for the proper period of time.

The parts of the inner tube not being repaired are thrown over the rail 9 to keep the same out of the way and out of contact with the hot vulcanizing apparatus.

When the required period of time has elapsed, the set screw is turned backward, the arm 12 raised, and the block and inner tube removed. As shown in Fig. 1, I prefer to have the receptacle 1 elongated and to provide it with several lever arms 12 in order that several articles can be vlucanized simultaneously. At one end I prefer to have the surface 2 project somewhat beyond the end of the receptacle, as at 23, and to provide this shelf 23 with a slot or notch 24, in order that when a patch is to be applied to the inner tube close to its valve tube, the latter can be permitted to hang through the slot while the block 21 and the lever arm 12 are operative over it.

I prefer to have the pressure block 21 cupped, as shown in Fig. 3, and filled with a yielding pad 25, preferably composed of soft rubber projecting therefrom, to equalize the pressure.

What I claim is:

1. A vulcanizing apparatus comprising a heated surface, a standard bearing a fixed relationship with respect to said surface, an arm rigidly projecting from said standard, a lever arm pivotally supported by said standard, and a set screw engaging said lever arm and the arm projecting from the standard for pressing the nose of the lever arm toward said heated surface.

2. A vulcanizing apparatus comprising a heated surface, a standard attached thereto and rising above the level thereof, the standard having an arm projecting therefrom away from said surface, a lever arm pivoted at an intermediate point to said standard to present its nose over the heated surface, and a set screw tapped through the opposite end of the lever arm and abutting against the arm projecting from the standard.

3. A vulcanizing apparatus comprising a heating chamber having a flat top surface, said surface projecting a short distance beyond the chamber to form a shelf, said shelf having a slot therein, and means for applying a pressure upon said shelf.

4. A vulcanizing apparatus comprising an elongated receptacle for water having a flat elongated top surface, means for heating the contents of said receptacle, a valve-controlled funnel, a pressure gage and a safety valve all connected with said receptacle, a plurality of pressure-applying arms pivotally connected with said receptacle at its back, and a rail supported above the level of said parts.

5. A vulcanizing equipment comprising a heated supporting surface, a pressure applying means, and pressure block consisting of a cupped block having a body of yielding material therein and projecting therefrom.

In testimony that I claim the foregoing invention, I have hereunto set my hand this 14th day of August, 1919.

HUGH ROBERT AULD.